United States Patent Office 2,773,107
Patented Dec. 4, 1956

2,773,107

RECOVERY OF AROMATIC HYDROCARBONS FROM HF-BF₃ AGENT

Charles D. Kalfadelis, Hammond, Ind., assignor to Standard Oil Company, Chicago, Ill., a corporation of Indiana No Drawing. Application February 3, 1955,
Serial No. 486,021

5 Claims. (Cl. 260—668)

This invention relates to the treatment of aromatic hydrocarbons with liquid $HF-BF_3$ agent. More particularly the invention relates to the recovery of polyalkylbenzenes from the liquid $HF-BF_3$ acid phase.

Recent developments in the field of catalytic processing have enabled the production of pure polyalkylbenzene isomers by the use of a liquid $HF-BF_3$ agent. For example, it is now possible to prepare essentially pure meta-xylene by the isomerization of ortho and paraxylene in the presence of a liquid $HF-BF_3$ agent. Essentially pure 3,5-dimethyl-1-ethylbenzene can be made by the interaction of a xylene and ethylbenzene under conditions of time and temperature in the presence of liquid $HF-BF_3$ agent. Or ethylbenzene may be disproportionated to either essentially pure meta-diethylbenzene or a mixture of essentially pure meta-diethylbenzene and 1,3,5-triethylbenzene in the presence of liquid $HF-BF_3$ agent. By the use of this liquid $HF-BF_3$ agent, it is possible to produce essentially pure isomers of polyalkylbenzenes containing from 2 to 4 alkyl groups where each alkyl group contains from 1 to 4 carbon atoms. For example, meta-diethylbenzene, meta-isopropyltoulene, meta-diisopropylbenzene, 1,3,5 - ethylxylene, 1,3,5-isopropylxylene, meta - di - t - butylbenzene, meta-1,3,5-n-propylbenzene, etc.

The essentially pure products are easily obtained by treating with water the acid phase which contains the polyalkylbenzene in the form of an $HF-BF_3$ complex. The complex is decomposed and the aromatic hydrocarbons may be decanted from the aqueous phase. In the large scale operation wherein HF and $BF_3$ must be recovered in a reusable form, it has been found that the distillative removal of HF and $BF_3$ from the acid phase in order to recover the aromatic hydrocarbons has introduced complications. While removal of the HF and $BF_3$ is feasible at very low temperatures under vacuum, higher temperature operations have caused side reactions to take place during the distillative removal of HF and $BF_3$, which side reactions seriously impair the purity of the polyalkylbenzenes recovered. For example, the 1,3,5-ethylxylene appears to isomerize to 1,3,4-ethylxylene and other isomers of ethylxylene.

It is theorized that in the distillation zone the $BF_3$ is rapidly distilled away from the acid phase and the complex. After the $BF_3$ is distilled there remains in the distillation zone a mixture of liquid HF and the aromatic hydrocarbons. At the temperature of distillation, the liquid HF acts catalytically and causes rearrangements to take place wherein the polyalkylbenzenes change from the essentially pure meta-orientation to the natural mixture of isomers normally found.

An object of the invention is a liquid $HF-BF_3$ catalyzed process wherein HF and $BF_3$ are distillatively removed without substantial impairment of the purity of the polyalkylbenzene product. A particular object is a liquid $HF-BF_3$ catalyzed process for reacting aromatic hydrocarbons to produce meta-oriented polyalkylbenzene product wherein the HF and $BF_3$ are distillatively removed to recover a liquid aromatic hydrocarbon product, which distillative removal is carried out in such a manner that no substantial amount of rearrangement reactions occur during said HF removal operation. Other objects will become apparent in the course of the description.

In the process of the invention, a benzene hydrocarbon is treated with sufficient liquid HF to form a distinct separate acid phase and $BF_3$, under substantially anhydrous conditions, to produce a solution in liquid HF of an $HF-BF_3$ polyalkylbenzene complex. The polyalkylbenzene is recovered from the acid phase by distillatively removing HF and $BF_3$ in the presence of an added $BF_3$ stripping gas. Preferably sufficient $BF_3$ stripping gas is introduced into the acid phase existing in the distillation zone to maintain therein at least 1 mole of $BF_3$ per mole of polyalkylbenzene therein over the period of HF removal.

The benzene hydrocarbon charged to the process may be an alkylbenzene which is disproportionated or isomerized by liquid $HF-BF_3$ agent. For example, ethylbenzene is disproportionated to meta-diethylbenzene; orthoxylene is isomerized to meta-xylene; mono-t-butylbenzene is disproportionated to meta-di-t-butylbenzene and 1,3,5-tri-t-butylbenzene. Or the benzene hydrocarbon may be a mixture of 2 or more different alkylbenzenes which interact to produce a polyalkylbenzene which is meta-oriented. For example, xylene and ethylbenzene interact to produce 1,3,5-ethylxylene under the proper conditions of time and temperature. Isopropylbenzene and xylene interact to produce 1,3,5-isopropylxylene. Or the polyalkylbenzene product may be produced by the alkylation of benzene hydrocarbons. For example, benzene may be ethylated to 1,3,5-triethylbenzene. Xylene may be propylated to 1,3,5-isopropylxylene.

In general, all of these processes require the presence of at least 1 mole of $BF_3$ per mole of polyalkylbenzene present in the feed or present in the product. Thus in the isomerization of ortho-xylene to meta-xylene at least 1 mole of $BF_3$ is present per mole of ortho-xylene in the charge. In the disproportionation of ethylbenzene to meta-diethylbenzene, at least 1 mole of $BF_3$ is present per mole of diethylbenzene product or one-half mole per mole of ethylbenzene charged. More generally, at least 1 mole of $BF_3$ is utilized per mole of aromatic hydrocarbon in the feed.

In the liquid $HF-BF_3$ catalyzed operations at least enough liquid HF is present to participate in the formation of the polyalkylbenzene complex and to dissolve that complex; thus at least sufficient liquid HF is present to produce a distinct separate acid phase. In general, at least about 3 moles of liquid HF are used per mole of aromatic hydrocarbon and more usually between about 6 and 15 moles per mole of aromatic hydrocarbon in the charge.

The conditions of time and temperature and the particular type of charge which are necessary to produce the particular meta-oriented polyalkylbenzene product are not a direct concern of this invention. The specific problem which is overcome by the invention herein lies in the substantial elimination of the rearrangement reactions which occur in the meta-oriented polyalkylbenzenes which contain from 2 to 4 carbon atoms in each alkyl group when these polyalkylbenzenes are recovered from the acid phase by distilling away the HF and $BF_3$. Certain of these polyalkylbenzenes rearrange very readily. For example, meta-diisopropylbenzene rearranges at such low temperatures that operation under vacuum to remove HF at temperatures below 20° C. may result in appreciable isomerization to the ortho and para configurations. The tertiary butylbenzenes also are extremely difficult to recover without appreciable rearrangements when the HF is distilled from the acid phase. On the other hand, the methylbenzenes are relatively stable and may be recovered at fairly high temperatures without appreciable rearrangement. This is particularly true of mesitylene and isodurene. Also, the ethyl derivatives are relatively stable and may be recovered at moderate temperatures without appreciable rearrangement. However, economic operation requires that the HF and $BF_3$ be removed from the acid phase in the shortest time and this means that the highest temperature practicable should be used. It has been found that the amount of rearrangement taking place in the acid phase during the period of distillative removal of HF is substantially reduced if the distillation is carried out in the presence of $BF_3$ stripping gas and thereby higher temperature distillative decomposition of the acid phase is feasible.

The added $BF_3$ stripping gas is introduced into a liquid phase which exists in the distillation zone. The $BF_3$ stripping gas is preferably introduced below the level of liquid in the bottom of the distillation column or below the level of the liqiud in the distillation pot. However, in a continuous distillation column, $BF_3$ stripping gas may be introduced at any point below the point wherein appreciable amounts of HF are present in the liquid phase.

The $BF_3$ stripping gas is introduced more or less uniformly into the distillation zone over the period of time required to remove all or substantially all the liquid HF from the aromatic hydrocarbon product. The introduction of even small amounts of $BF_3$ is beneficial in retarding rearrangement reactions. However, it is preferred to introduce an amount of $BF_3$ stripping gas such that there is maintained in the liquid phase in the distillation zone at least 1 mole of $BF_3$ per mole of polyalkylbenzene present therein. It is to be understood that as the amount of liquid HF present decreases to the point that there is less than 1 mole of liquid HF per mole of polyalkylbenzene, the amount of $BF_3$ needed as stripping gas is proportionately reduced because the complex contains 1 mole of $BF_3$, 1 mole of HF and 1 mole of polyalkylbenzene.

In the process wherein xylene and ethylbenzene are interacted to produce 1,3,5-ethylxylene, or xylene is ethylated to produce 1,3,5-ethylxylene, the rearrangement of the 1,3,5-ethylxylene during the distillative removal of HF and $BF_3$ may be substantially eliminated by using between about 6 and 25 moles of $BF_3$ per mole of polyalkylbenzene in the acid phase; this amount of $BF_3$ stripping gas being added over the period of liquid HF removal. When operating under conditions such that the distillation zone amounts substantially to a batch operation, since the holding time in the distillation zone is prolonged on the order of 15 minutes or more, it is preferred to maintain the temperature of the acid phase in the distillation zone at a temperature between about 25° C. and 90° C. and more preferably, between about 40° C. and 65° C. When operating in the preferred temperature range, it is preferred to use between about 10 and 20 moles of $BF_3$ stripping gas per mole of polyalkylbenzene in the distillation zone, said $BF_3$ being introduced into the liquid phase over the period of time required for the removal of essentially all the HF.

The results obtainable utilizing the process of this invention are illustrated by the following tests. In these tests, a close-boiling mixture of ortho-xylene, para-xylene, meta-xylene, ethylbenzene and small amounts of paraffins and trimethylbenzenes was treated at about 65° C. for about 40 minutes with about 11 moles of commercial anhydrous hydrofluoric acid and about 1.9 moles of commercial grade $BF_3$, respectively, per mole of aromatic hydrocarbon in the feed. Under these conditions all of the hydrocarbons in the feed were taken up into the acid phase either in the form of a complex or in physical solution. In order to insure recovery of hydrocarbons without subsequent rearrangement, in each instance an aliquot of the acid phase was decomposed with cold water. The oil layer was decanted from the water layer, neutralized, and water washed and then fractionated into close-boiling fractions. These close-boiling fractions were then analyzed by infrared techniques. Typically the hydrocarbon product consisted of, on a mole percent basis, benzene, 10, toluene, 5, xylene 39, trimethylbenzene, 7 and ethylxylene, 39. The exact composition of the xylene and ethylxylene fractions varied somewhat with the particular conditions of time and temperature in the interaction zone.

In the distillative removal of HF and $BF_3$, an aliquot of the acid phase was introduced into a small fractionator provided with a large heated pot and a fractionating column. The liquid acid phase was introduced into the column near the bottom thereof and the principal amount of HF was actually distilled from the liquid in the pot. The temperature of the liquid in the pot was measured and the times were taken for the complete removal of HF from the liquid hydrocarbon product bottoms. The hydrocarbon product was removed from the pot as a liquid, i. e., none was taken overhead.

In tests wherein $BF_3$ stripping gas was introduced, commercial $BF_3$ gas was introduced into the pot below the level of the liquid therein.

*Test 1*

The ethylxylene fraction recovered from the hydrocarbon product after water decomposition of the acid phase was analyzed by infrared technique and found to contain 99% of the 1,3,5-ethylxylene isomer.

The acid phase was introduced into the distillation apparatus and the HF and $BF_3$ were removed over a period of 45 minutes at a pot temperature of 40° C. (103° F). No stripping gas of any sort was introduced into the pot and the ethylxylene fraction recovered by this distillative removal of HF and $BF_3$ was found to contain only 90% of 1,3,5-ethylxylene; the remainder of the fraction consisted mainly of the 1,3,4-ethylxylene isomer.

*Test 2*

The acid phase which was decomposed in this test was derived from a different xylene-ethylbenzene interaction batch. The ethylxylene fraction obtained after water decomposition of the acid phase was found to contain 93% of the 1,3,5-ethylxylene isomer.

An aliquot amount of this acid phase was charged to the distillation apparatus. This aliquot amount contained 0.45 mole of polyalkylbenzene as xylene, trimethylbenzene and ethylxylene. The total time required for the removal of HF was 73 minutes and the pot temperature was maintained at 42° C. (108° F). Over the course of the HF removal, 7.2 moles of $BF_3$ were introduced into the pot below the level of liquid therein. This amount of $BF_3$ stripping gas is equal to about 16 moles per mole of polyalkylbenzene in the pot. Infrared analysis of the ethylxylene fraction recovered by this method showed ethylxylene to contain, within experimental error, the same amount of 1,3,5-ethylxylene isomer as was obtained by the water displacement method, i. e., the ethylxylene fraction contained 93 mole percent of the 1,3,5-ethylxylene isomer.

*Test 3*

In this test, another aliquot of the same acid phase as used in Test 2 was distillatively decomposed to remove HF and $BF_3$. In this test, the total time for HF removal was 97 minutes and the pot temperature was 41° C. (106° F). Isobutane to the extent of 9.6 moles was introduced as a stripping agent below the level of liquid in the pot. This corresponds to about 8 moles of isobutane per mole of polyalkylbenzene in the pot. Infrared analysis of the ethylxylene fraction recovered after the isobutane stripping gas assisted HF and BF₃ distillative removal showed this fraction to contain 85% of 1,3,5-ethylxylene isomer.

A comparison of the results of Tests 1, 2 and 3 which show that at a temperature of about 40° C., without the use of any stripping gas, about 10% of the 1,3,5-ethylxylene rearranged to 1,3,4-ethylxylene and other isomers; about the same amount of rearrangement took place when isobutane was introduced as a stripping aid; within experimental error no rearrangement took place when BF₃ was used as the stripping gas during the distillative removal of HF and BF₃.

*Test 4*

Two tests were carried out at about 80° C., in order to determine the effect of higher temperature operation on the amount of ethylxylene rearrangement. In this test, the ethylxylene fraction recovered after water decomposition of the acid phase was found to contain 97 mole percent of the 1,3,5-ethylxylene isomer.

This acid phase was distilled to remove HF and BF₃ over a time of 68 minutes at a temperature of 78° C. (172° F.). No stripping aid was used. The ethylxylene fraction recovered by the distillative removal of HF and BF₃ was found to contain 82% of the 1,3,5-ethylxylene isomer; this represents about a 16% loss of 1,3,5-ethylxylene due to rearrangement to 1,3,4- and other isomers.

*Test 5*

The acid phase charged to this test contained an ethylxylene fraction, as recovered by the water displacement technique, which analyzed 95% of the 1,3,5-ethylxylene isomer.

In this test, the acid phase was distilled to remove HF and BF₃ over a period of 73 minutes at a pot temperature of 82° C. (181° F.). Over this period of time, 8.8 moles of BF₃ stripping gas were introduced into the pot below the surface of the liquid therein. This amounts to about 12 moles of BF₃ per mole of polyalkylbenzene present in the pot.

The ethylxylene fraction recovered by the BF₃ stripping gas aided the HF removal operation and analyzed 90% of the 1,3,5-ethylxylene isomer. This represents a rearrangement loss of about 5% of the 1,3,5-ethylxylene. However, this ethylxylene fraction is still usable as a high purity 1,3,5-ethylxylene material. Thus, even at this elevated temperature, the introduction of BF₃ stripping gas into the distillation zone very markedly decreases the amount of ethylxylene rearrangement taking place during the distillative removal of HF.

Thus having described the invention, what is claimed is:

1. In the process where a benzene hydrocarbon is treated with liquid HF–BF₃ agent to produce a solution comprising HF–BF₃-polyalkylbenzene complex and liquid HF, said polyalkylbenzene containing from 2 to 4 alkyl groups with each alkyl group containing from 1 to 4 carbon atoms, and the hydrocarbons in said solution are recovered as a liquid drainoff product by distilling HF and BF₃ from said solution, the improvement which comprises introducing into said solution in said distillation zone BF₃ stripping gas.

2. The process of claim 1 wherein the amount of BF₃ introduced is sufficient to maintain in the liquid phase existent in said distillation zone at least about 1 mole of BF₃ per mole of said polyalkylbenzene for about the time required to distill substantially all of the HF from said liquid phase.

3. The process of claim 2 where the total amount of BF₃ introduced into said distillation zone is between about 6 and 25 moles of said polyalkylbenzene.

4. The process which comprises contacting a feed comprising xylene and ethylbenzene, under substantially anhydrous conditions, with BF₃ in an amount of at least about 1 mole per mole of xylene and at least sufficient liquid HF to form a distinct, separate acid phase under conditions of time and temperature to form ethylxylene interaction product consisting essentially only of 1,3,5-ethylxylene, which ethylxylene is present in said acid phase, and recovering said ethylxylene product by distillative removal of HF and BF₃, in the presence of added BF₃ stripping gas.

5. The process of claim 4 wherein said removal is carried out at a temperature between about 25° C. and 90° C. and said BF₃ gas in between about 6 and 25 moles per mole of polyalkylbenzene in said acid phase, said gas being added over the period of HF removal.

References Cited in the file of this patent

UNITED STATES PATENTS

| | | |
|---|---|---|
| 2,480,939 | Lee et al. | Sept. 6, 1949 |
| 2,521,444 | Brooke et al. | Sept. 5, 1950 |
| 2,528,893 | Lien et al. | Nov. 7, 1950 |
| 2,564,073 | Lien et al. | Aug. 14, 1951 |